United States Patent Office 3,001,874
Patented Sept. 26, 1961

3,001,874
POULTRY FEED
Robert J. Wineman, Kirkwood, Mo., assignor to Monsanto Chemical Company, St. Louis, Mo., a corporation of Delaware
No Drawing. Filed July 15, 1957, Ser. No. 671,713
6 Claims. (Cl. 99—4)

This invention relates to novel poultry feed compositions and to the useful adjuvant for improving poultry feeds deficient in essential amino acids. The invention also is directed to methods of improving methionine deficiencies in poultry feeds.

It is well known to improve methionine deficient feeds by the addition of synthetic methionine. It is also known that the hydroxy analogues of the methionine have nutrient values, and in many respects are the equivalent of the methionine for nutrient purposes. In the U.S. Patent 2,745,745 there are described and claimed poultry feeds containing alkaline earth metal salts of the methionine hydroxy analogue, the 2-hydroxy-4-methylthio-butyric acid. These alkaline earth metal salts are used because of the facility of separation and purification procedures.

In copending application Serial No. 631,511, filed December 31, 1956, by Edward S. Blake and Robert J. Wineman, there are described and claimed methods of preparing the alkali metal salts of 2-hydroxy-4-methylthio-butyric acid in high yields and relatively free of the hydrocyanic acid, the presence of which compelled the prior art to separate the 2-hydroxy-4-methylthio-butyric acid in the form of its calcium salt. By the special techniques described in the copending application, it has become possible to prepare the alkali metal salts in the form suitable for the addition to poultry feeds in a manner not known or believed possible to workers in the prior art.

In view of the present feasibility of preparing nutrient grade alkali metal salts of the 2-hydroxy-4-methylthio-butyric acid, it has now been found that the addition of the said alkali metal salts to poultry feeds provides benefits not appreciated by the prior art and nutrient results beyond the expectations of one skilled in the prior art.

The aqueous solutions of alkali metal salts of the 2-hydroxy-4-methylthio-butyric acid as described in the copending application and the same salts separated from the aqueous solution by known methods of separation, are useful substitutes for methionine in supplementing low methionine animal feeds, as chemotherapeutic agents for treating dietary ailments and for other purposes usually requiring methionine.

The alkali metal salts of the 2-hydroxy-4-methylthio-butyric acid and the aqueous solutions thereof may be added directly to dry feed stocks, for example poultry feeds containing grains, whole or processed, waste vegetable products from the oil pressing industries, such as soy bean meal, peanut meal and cotton seed meal. Products of these types are known to contain less of the methionine than is required for optimum growth and efficient feed utilization by poultry. Animal feeds which will be benefited by the addition of the new aqueous nutrient product may also contain minor quantities of animal waste products, for example fish meal, casein and gelatine. Since the animal products frequently contain sufficient methionine to provide the requirements of animals, the new products are particularly useful in supplementing feeds comprised predominately of vegetable products as most practical feeds are. The new liquid compositions are adaptable as supplements to dry feed stocks, to moist feeds and to drinking water.

To demonstrate the efficiency of the liquid product containing sodium 2-hydroxy-4-methylthio-butyrate as compared to the calcium salt of 2-hydroxy-4-methylthio-butyric acid and methionine, poultry growing experiments were conducted.

Experiment A

One day old chicks (Nickols New Hampshire) were sorted by weight and placed 20 per pen in heated batteries. At the age of 7 to 10 days, they were weighed again and the 12 chicks closest to average were retained on the feed test. Several groups of the chicks were fed on each of the following rations:

(1) An experimental feed including isolated soy bean protein, 16 percent fat, sugar, minerals and vitamins.
(2) (1) with 0.18 percent of solid calcium 2-hydroxy-4-methylthio-butyrate prepared by sulfuric acid hydrolysis.
(3) (1) with dimethionine molecularly equivalent on the acid basis to 0.18 percent of the calcium salt of (2).
(4) (1) with the solution of sodium 2-hydroxy-4-methylthio-butyrate in an amount equivalent molecularly on the acid basis to 0.18 percent of the calcium salt of (2) and prepared by hydrochloric acid hydrolysis.

The chicks were fed for eight weeks and the total gain (in grams) and the feed efficiency (weight of feed consumed weight gain) were measured. The following table shows the averages of the several replications.

| Gain in grams: | Feed efficiency |
|---|---|
| (2) 452 | 1.61 |
| (3) 448 | 1.60 |
| (4) 470 | 1.53 |

Experiment B

A replicated experiment was conducted precisely identical to A except that a practical poultry ration was used. The following feeds were used:

(1) A practical ration corn meal, soy bean oil meal, fish meal, fat, minerals and vitamins.
(2) (1) with 0.5 percent by weight of solid calcium 2-hydroxy-4-methylthio-butyrate prepared by sulfuric acid hydrolysis.
(3) (1) with 1.17 percent by weight (equivalent) solution of sodium 2-hydroxy-4-methylthio-butyrate prepared by hydrochloric acid hydrolysis.

Following are averages of the several replications.

| Gain in grams: | Feed efficiency |
|---|---|
| (1) 366 | 1.77 |
| (2) 496 | 1.32 |
| (3) 517 | 1.24 |

It is apparent that the solution of the sodium salt of 2-hydroxy-4-methylthio-butyric acid is more effective and efficient than the solid calcium salt.

What is claimed is:
1. A poultry feed comprised of methionine deficient vegetable products and not more than a minor quantity of product derived from animal sources supplemented with alkali metal salts of 2-hydroxy-4-methylthiobutyric acid.
2. A poultry feed comprising methionine deficient vegetable products and not more than a minor quantity of products derived from animal sources and sodium 2-hydroxy-4-methylthiobutyrate.
3. A poultry feed comprised of a feed stock deficient in methionine and an alkali metal salt of 2-hydroxy-4-methylthiobutyric acid.
4. A poultry feed comprised of a feed stock deficient in methionine and sodium 2-hydoxy-4-methylthiobutyrate.
5. A poultry feed consisting of a feed stock comprised essentially of products selected from the group consisting of whole grains, processed grains and waste vege- table products and alkali metal salts of 2-hydroxy-4-methylthiobutyric acid.

6. A poultry feed consisting of a feed stock comprised essentially of products selected from the group consisting of whole grains, processed grains and waste vegetable products and sodium 2-hydroxy-4-methylthiobutyrate.

References Cited in the file of this patent

UNITED STATES PATENTS

| | | |
|---|---|---|
| 2,727,065 | Anagnostropoulos | Dec. 13, 1955 |
| 2,745,745 | Blake | May 15, 1956 |
| 2,879,162 | Baldini | Mar. 24, 1959 |